US010586141B2

(12) United States Patent
Allirot et al.

(10) Patent No.: US 10,586,141 B2
(45) Date of Patent: Mar. 10, 2020

(54) COMMUNICATIONS ANTENNA FOR A CONTACTLESS PAYMENT TERMINAL

(71) Applicant: INGENICO GROUP, Paris (FR)

(72) Inventors: Richard Allirot, Corenc (FR); Eric Dubois, Montvendre (FR); Olivier Fabregoule, Guilherand-Granges (FR)

(73) Assignee: INGENICO GROUP, Paris (FR)

( * ) Notice: Subject to any disclaimer, the term of this patent is extended or adjusted under 35 U.S.C. 154(b) by 0 days.

(21) Appl. No.: 16/060,645

(22) PCT Filed: Oct. 12, 2016

(86) PCT No.: PCT/EP2016/074518
§ 371 (c)(1),
(2) Date: Jun. 8, 2018

(87) PCT Pub. No.: WO2017/064149
PCT Pub. Date: Apr. 20, 2017

(65) Prior Publication Data
US 2019/0147310 A1 May 16, 2019

(30) Foreign Application Priority Data

Oct. 12, 2015 (FR) .................................. 15 59686

(51) Int. Cl.
G06K 19/06 (2006.01)
G06K 19/07 (2006.01)
G06K 7/10 (2006.01)
H04B 5/00 (2006.01)
H01Q 1/22 (2006.01)
G06Q 20/32 (2012.01)

(52) U.S. Cl.
CPC ..... G06K 19/0723 (2013.01); G06K 7/10316 (2013.01); H01Q 1/2216 (2013.01); H04B 5/0081 (2013.01); G06Q 20/3278 (2013.01)

(58) Field of Classification Search
USPC ......................................................... 235/492
See application file for complete search history.

(56) References Cited

U.S. PATENT DOCUMENTS

2008/0035741 A1\* 2/2008 Sakama ........... G06K 19/07749
235/492
2009/0170559 A1 7/2009 Phillips
2014/0284386 A1 9/2014 Finn et al.

FOREIGN PATENT DOCUMENTS

EP         1748515 A1    1/2007

OTHER PUBLICATIONS

International Search Report dated Dec. 1, 2016 for corresponding International Application No. PCT/EP2016/074518, filed Oct. 12, 2016.
English translation of the International Written Opinion dated Dec. 1, 2016 for corresponding International Application No. PCT/EP2016/074518, filed Oct. 12, 2016.

\* cited by examiner

Primary Examiner — Jamara A Franklin
(74) Attorney, Agent, or Firm — David D. Brush; Westman, Champlin & Koehler, P.A.

(57) ABSTRACT

A communication antenna, which includes a first area for transmitting and receiving signals and a second area for receiving electronic components. The first area is located in a first plane, referred to as a higher level plane, and the second area is located in a second plane, referred to as a lower level plane. The lower level plane is parallel to the higher level plane.

14 Claims, 4 Drawing Sheets

COMMUNICATIONS ANTENNA FOR A CONTACTLESS PAYMENT TERMINAL

CROSS-REFERENCE TO RELATED APPLICATIONS

This Application is a Section 371 National Stage Application of International Application No. PCT/EP2016/074518, filed Oct. 12, 2016, which is incorporated by reference in its entirety and published as WO 2017/064149 A1 on Apr. 20, 2017, not in English.

1. FIELD OF THE INVENTION

The invention relates to the field of communications antennas. The invention relates more particularly to the field of near-field communications antennas for contactless payment terminals.

2. PRIOR ART

In recent years, contactless payment systems have rapidly come to be deployed in markets worldwide. These systems include payment means and payment terminals provided with contactless communications functions. The payment means can be bankcards, mobile telephones, or even keyrings that integrate antennas and chips to carry out contactless transactions. In these systems, a contactless sending/transmission technology is often used. This is for example a near-field communication (NFC) technique. Near-field communications (NFC) refers to a technology of short-range high-frequency wireless communications. This technology enables the exchange of data between two compatible devices at a maximum distance of about 10 cm. This technology is an extension of the standard defining proximity cards using radio-frequency identification (RFID) combining the interface of a smartcard and a reader within a single peripheral.

One example of a payment terminal (known as an unattended terminal) implementing this data transmission technique often comprises a front cover, an electronic board 1 and a rear cover. As illustrated with reference to FIG. 1, a near-field communications antenna 12 is fixed to the electronic board 1. A contactless payment indicator is placed at the center of the front cover. Light-emitting diodes (LEDs) 110 are soldered to the electronic board area behind the contactless payment indicator. A light guide is disposed between the light-emitting diodes and the indicator in order to obtain sufficient light. The indicator can thus be illuminated by these light-emitting diodes 110.

Such a prior-art contactless payment terminal has several drawbacks. Firstly, the size of the electronic board is relatively great. This makes the payment terminal bulkier. Indeed, an additional area needs to be planned on the electronic board to mount the near-field communications antenna and the light-emitting diodes (LED). The cost of manufacturing such a payment terminal is also high.

Secondly, the performance of the antenna is not satisfactory. On the one hand, the electronic components and the printed circuit boards on the electronic board produce major disturbances for the communications antenna; on the other hand, the antenna cannot be placed close enough to the front cover because the dimensions of the electronic components on the electronic card are great as compared with the communications antenna. Even if these electronic components are placed directly against the inner surface of the front cover, there is still a non-negligible distance between the antenna and the front cover. Indeed, for near-field communications, the attenuation of the signals is great even for a very short distance.

Thirdly, the payment terminal is less resistant to external mechanical impacts and cannot successfully pass the demanding tests required for compliance with European standards (for example the European standard EN 62262). Indeed, to improve the performance of the antenna, the distance between the antenna and the cover must be reduced to the utmost possible extent. Thus, the electronic board is placed just behind the front cover of the payment terminal. The electronic components including the light-emitting diodes are placed directly against the rear surface of the front cover. When the front cover undergoes a mechanical shock, the electronic components on the electronic board are likely to be damaged by the energy transmitted by the front cover.

It is then necessary to have a new contactless payment terminal that can resolve the problems and issues related to the prior art.

3. SUMMARY

The proposed technique does not have these problems of the prior art. More particularly, the proposed technique relates to an unattended payment terminal (also called an independent or unsupervised terminal) in which the contactless antenna is formed out of a flexible material.

Such a flexible material makes it possible firstly to conform the antenna more easily and secondly to offer increased resistance to shocks. Besides, the conforming of the antenna resolves a problem of compactness of the independent terminal.

Thus, the invention relates to a communications antenna characterized in that it comprises a first zone for sending and receiving signals and a second zone for receiving electronic components, said first zone being situated in a first plane, called a higher-level plane, said second zone being situated in a second plane, called a lower-level plane, said lower-level plane being appreciably parallel to said higher-level plane.

Thus, such an antenna enables the designing of more compact and more resistant terminals.

According to one particular characteristic, the antenna is formed by a flexible printed circuit board. Thus, the antenna can be placed more simply within a payment terminal.

According to one particular embodiment, said antenna is conformed to carry out near-field communications.

Thus, the creation of an independent payment terminal is simpler.

According to one particular characteristic, said first zone is a peripheral zone of said antenna, comprising at least one turn.

According to one particular characteristic, said second zone is a zone at the center of said antenna.

According to one particular characteristic, said lower-level plane is recessed by about 6 mm relative to said higher-level plane.

Thus, the antenna is capable of getting deformed during its use.

According to one particular embodiment, the electronic components that can be received on said second zone comprise at least one light-emitting diode (LED).

Thus, the center of the antenna is capable of being illuminated.

According to one particular embodiment, said antenna comprises a holding foam, said holding foam being placed between said higher-level plane and said lower-level plane to hold said second zone in said lower-level plane.

Thus, the deformation of the first zone can be absorbed by the holding foam, thus preventing this deformation from being propagated to the second zone for example in the event of a shock or impact.

According to one particular embodiment, said holding foam comprises a first aperture made above the electronic components on said second zone.

Thus, the electronic components which can for example be light-emitting diodes are not masked by the holding foam, thus preventing any deterioration of these electronic components.

According to another aspect, the invention also relates to a contactless payment terminal comprising a front cover and an electronic board. Such a terminal comprises a communications antenna as presented here above, said antenna being disposed between said front cover and said electronic board.

According to one particular characteristic, the first zone of said antenna is mounted on an inner surface of said front cover. Thus, the sending and reception of data in a near field are disturbed or inhibited by a distance that is excessive relative to the cover or else disturbed or inhibited by the presence of disturbing electronic components.

According to one particular characteristic, said front cover comprises a contactless payment indicator, said second zone of said antenna being at least partially placed directly over said indicator.

According to one particular embodiment, said indicator is capable of being illuminated by light-emitting diodes placed on said second zone of said antenna.

According to another aspect, the invention also relates to a method for shaping an antenna as described here above. Such a method implements a cutting out of a pre-designed flexible printed circuit, then at least one step for conforming the cut-out flexible printed circuit board so as to form a flexible antenna comprising at least two appreciably parallel planes.

4. FIGURES

Other features and advantages shall appear more clearly from the following description of one particular embodiment of the disclosure, given by way of a simple illustrative and non-exhaustive example and from the appended drawings, of which:

5. DETAILED DESCRIPTION

Figure 1:
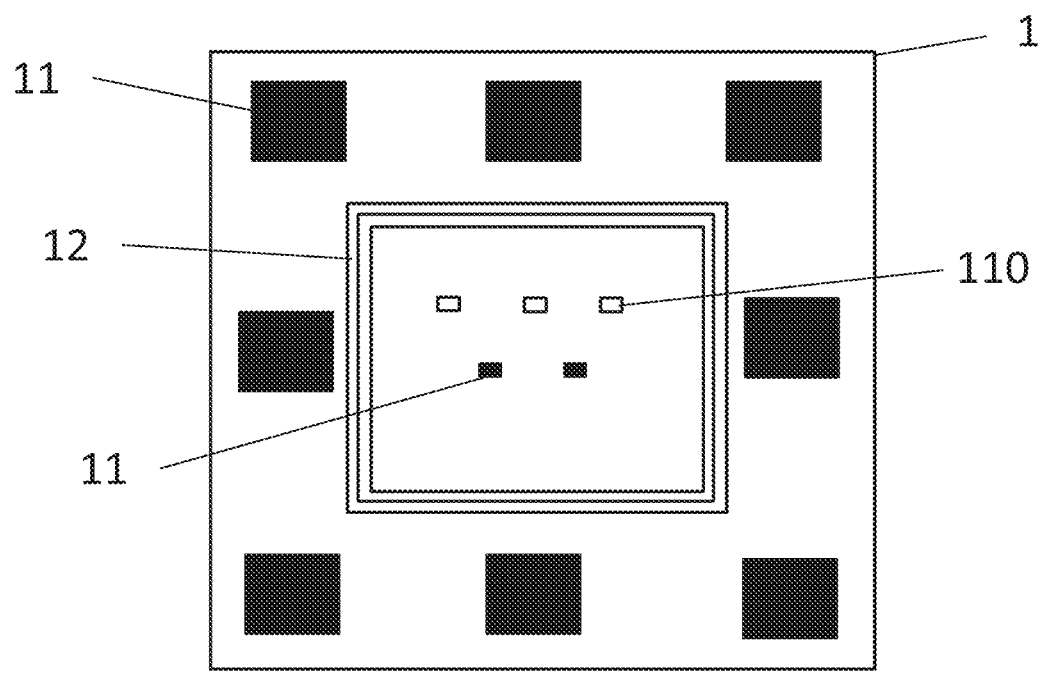
FIG. 1 illustrates an electronic board of a contactless payment terminal of the prior art.

With the goal of resolving the technical problems related to compactness, antenna performance and shock resistance in prior-art contactless payment terminals, the inventors, through the near-field communications antenna, have identified a technique for resolving at least some of these problems. Different embodiments of the antenna of the payment terminal are presented with reference to FIGS. 2 to 7.

The general principle of the proposed technique lies in making an antenna whose architecture is on two substantially parallel levels (two planes): the first level defines a first zone of the antenna, called a sending/reception zone. This first zone is the one that sends and receives near-field signals (contactless signals). The second zone is offset in depth relative to the first zone. This second zone is thus distant from the external surface of the payment terminal (i.e. the surface that is subjected to possible impacts and deterioration undergone by the payment terminal). This architecture enables the designing of a contactless payment terminal that, firstly, is more compact and, secondly, shows better resistance to impacts and deterioration undergone by the payment terminal. Indeed, having a two-level antenna substantially reduces the size of the electronic board to which this antenna is connected and therefore reduces the size of the payment terminal.

Thus, in general a novel communications antenna 2 is disclosed (illustrated with reference to FIG. 2), comprising two zones 21, 22 that are situated respectively on two substantially parallel planes of different levels. More specifically, the antenna 2 comprises a first zone 21 for sending and receiving signals, called a sending/reception zone, and a second zone 22 for receiving electronic components 11, 110. The first zone 21 is situated in a first plane, called a higher-level plane, and the second zone 22 is situated in a second plane, called a lower-level plane. The lower-level plane is parallel to said higher-level plane.

The first zone 21 of the communications antenna 2, which is situated in the higher-level plane, can be directly glued to the internal surface of a front cover 71 of a contactless payment terminal 7 (illustrated with reference to FIG. 7): this minimizes the distance between the antenna 2 and the contactless payment means passing before the front cover 71 of the payment terminal 7. The attenuation of the signals is reduced with the diminishing of the distance, and the intensity of the signals is thus guaranteed. Besides, the antenna 2 no is longer part of the electronic board 72 of the payment terminal 7 (as explained in FIG. 1). The electromagnetic disturbances produced by electronic components 11 of the electronic card 72 have less impact on the communications antenna 2. The performance of the antenna 2 increases because it is distant from the electronic board 72 which is one of the sources of the disturbances. In addition, since the electronic board 72 no longer includes a printed antenna 12, it is no longer necessary to place the electronic board 72 directly against the front cover 71 of the payment terminal 7 to minimize the distance between the antenna 12 and the front cover. The electronic board 72 can thus be placed behind the communications antenna Shocks on the front cover 71 of the payment terminal 7 therefore have far less impact on the electronic components on the electronic board 72. In other words, modifying the shape and the components of the antenna modifies the architecture of the payment terminal accordingly: placing the sending/reception zone 21 close to the front cover of the payment terminal ensures better reception of the signals coming from contactless devices (payment cards, smartphones) while limiting the risks for the contactless payment terminal because, as shall be explained here below, the second zone of the antenna is on the contrary distant from the surface of the front cover of the payment terminal.

Indeed, the second zone 22 of the antenna 2, which is situated on the lower-level plane, can receive electronic components 111, 110. It is thus possible to shift a certain number of electronic components 11, 110 from the electronic board to this second zone 32 of the antenna 2: more specifically, the electronic components that are shifted are for example LEDs (light-emitting diodes) serving to inform the user about the position at which the contactless device must be placed. The surface area initially set apart on the electronic board 72 for these electronic components 11, 110 can therefore be saved. The resulting size of the electronic board 72 according to the invention and the resulting size of the payment terminal 7 can thus be reduced. Besides, the second zone 22 is situated in the lower-level plane relative to the plane in which the first zone 21 of the antenna 2 (sending/reception zone) is situated. Thus, the electronic components 11, 110 mounted on the second zone 22 of the antenna 2 are relatively distant from the front cover 71 of the payment terminal. The shocks on the front cover 71 thus have less impact (or even no impact whatsoever) on these electronic components 11, 110. As explained here above, these electronic components mounted on the second zone 21 of the antenna 2 can include at least one light-emitting diode (LED) 110 disposed behind a contactless payment indicator on the front cover of the payment terminal. This indicator can thus be illuminated by the light-emitting diodes 110. The contactless payment indicators are often situated in a zone at the center of the front covers 71 of the contactless payment terminals. The second zone 22 of the antenna 2 is therefore situated at the center of the antenna 2 and the first zone is situated in a peripheral area of the antenna 2.

According to the proposed technique, the antenna 2 furthermore has a third zone 23, called a connection zone, that enables the antenna 2 to get connected to the electronic board 72 of the payment terminal 7. In this connection zone 23, there converge tracks for the sending and reception of the signals and tracks for the connection of the electronic components 11, 110 mounted on the second zone 22 of the antenna 2. In particular, these connection tracks include tracks to power and control the light-emitting diodes 110.

Figure 2:
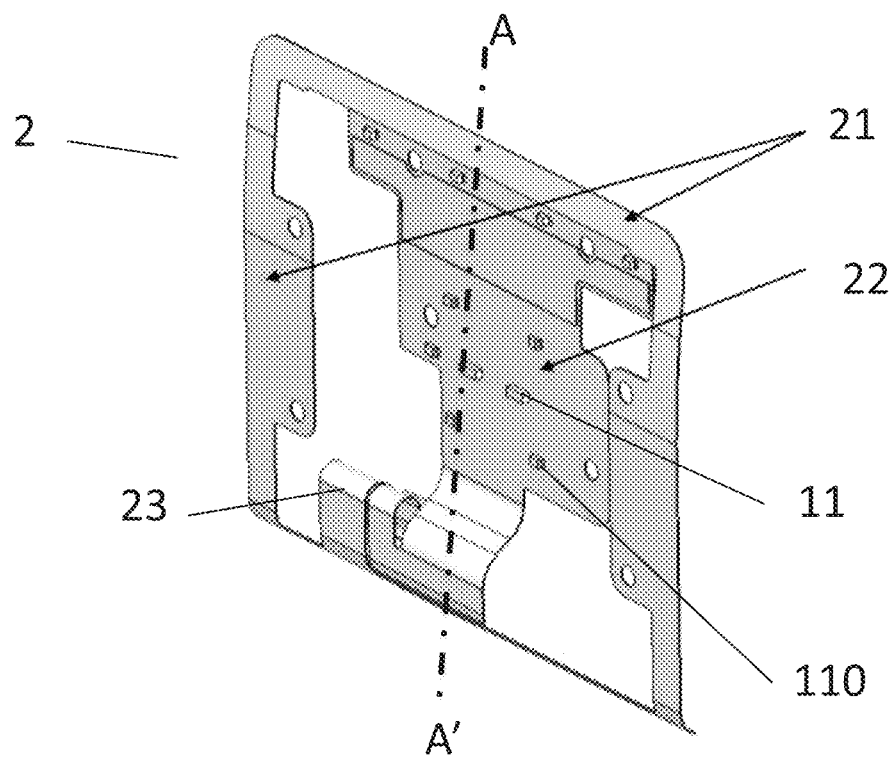
FIG. 2 illustrates the structure of an antenna according to the proposed technique.
Figure 3:
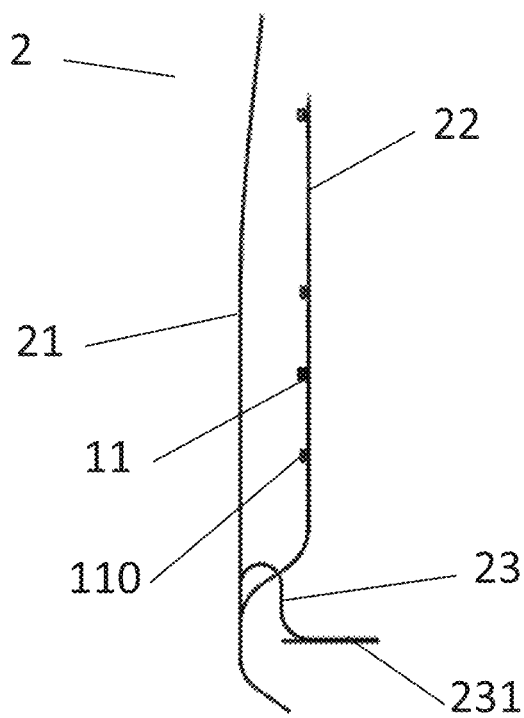
FIG. 3 is a view in section of the antenna of FIG. 2.

FIG. 3 is a view in section of the antenna 2 of the proposed technique along the axis A-A' illustrated in FIG. 2. It can be noted that the first zone 21 and the second zone 22 of the antenna 2 are generally situated on two different planes. These two planes are appreciably parallel to each other. The connection zone 23 extends towards the rear of the antenna. It comprises a connector 231 which can be inserted into a female connector soldered to the electronic board 72 of the payment terminal 7.

Figure 4:
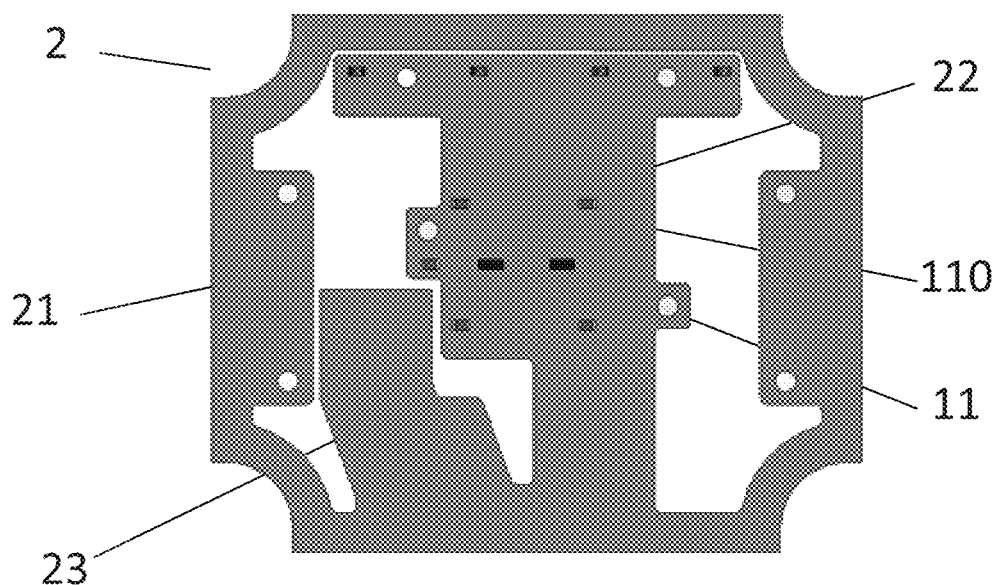
FIG. 4 illustrates a semi-manufactured antenna according to the proposed technique.

FIG. 4 illustrates a semi-manufactured antenna (i.e. an antenna before it is conformed according to the present technique, in two parallel planes and a connecting section) according to the proposed technique. This semi-manufactured antenna includes a first zone 21 situated on a peripheral zone, a second zone 22 situated at the center of the antenna and a third zone 23 extending from the first zone 21. All three zones 21, 22, 23 of the semi-manufactured antenna are situated in the same plane.

Preferably, and very advantageously, the antenna is manufactured out of a flexible printed circuit, for example with a polyamide (PI) or polyester (PET) base. The antenna 2 according to the proposed technique can thus be obtained by a step for cutting out a flexible printed circuit delivering a semi-manufactured antenna (cut-out flexible printed circuit board) and a step for forming (conforming) the semi-manufactured antenna.

This method of manufacture firstly offers the advantage of not unnecessarily wasting the flexible printed circuit. The first zone 21 has the function of a contactless antenna (sending and receiving signals) and comprises two copper loops and a "strap" resistor. Light-emitting diodes 110 (LEDs) mounted on the second zone 22 can include light-emitting diodes to indicate the progress of a transaction and/or light-emitting diodes to illuminate a contactless logo on the front cover 71 of a contactless payment terminal. Secondly, this method of manufacture enables the mounting of the electronic components on the flexible printed circuit board in a simple and efficient way. Indeed, the antenna does not need to be conformed in order to mount the electronic components (the LEDs for example) on the antenna. This mounting step can thus be done as a flat mounting, which is much faster and much more efficient.

Besides, unlike in the prior art, the antenna 2 according to the proposed technique re-utilizes the surface of the central zone of the flexible printed circuit board: now, it is known that the price of a flexible printed circuit board depends on its surface area before it is cut out. This means that any zone cut out is a zone paid for but not used: the principle of an antenna model as proposed does not have this drawback and is economically interesting. In addition, the surface area of the electronic board is reduced because the electronic components (for example the light-emitting diodes 110) are shifted to the second zone of the antenna.

Indeed, in the case of a usual compact payment antenna, the light-emitting diodes take up place that could be useful for the other electronic components. This often makes it necessary to add another complementary board that makes the payment terminal costlier and bulkier. In addition, the presence of the light-emitting diodes 110 on the second zone 22 of the antenna 2 does not require the addition of light guides as in the prior art. Indeed, with light-emitting diodes on the electronic board as on the payment terminals of the prior art, the presence of a light guide is indispensable to obtain sufficient light on the front cover of the payment terminal. This is not the case with the terminal of the present technique: indeed, the proposed antenna 2 also reduces the cost of manufacture of the payment terminal.

Figure 5:
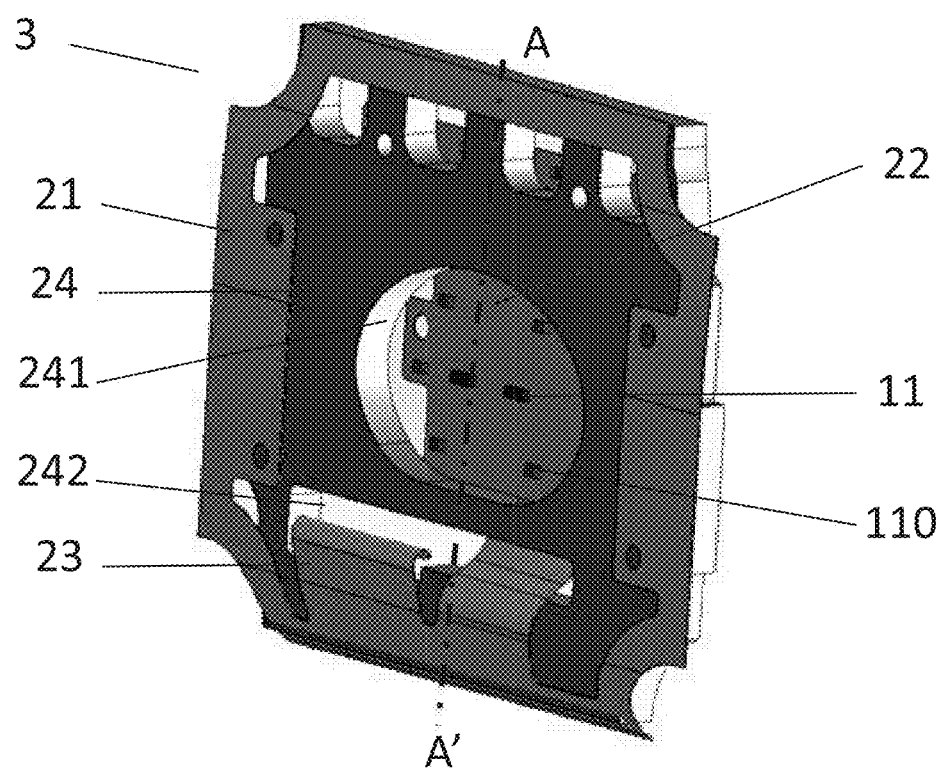
FIG. 5 illustrates the specific embodiment of the antenna according to the proposed technique.
Figure 6:
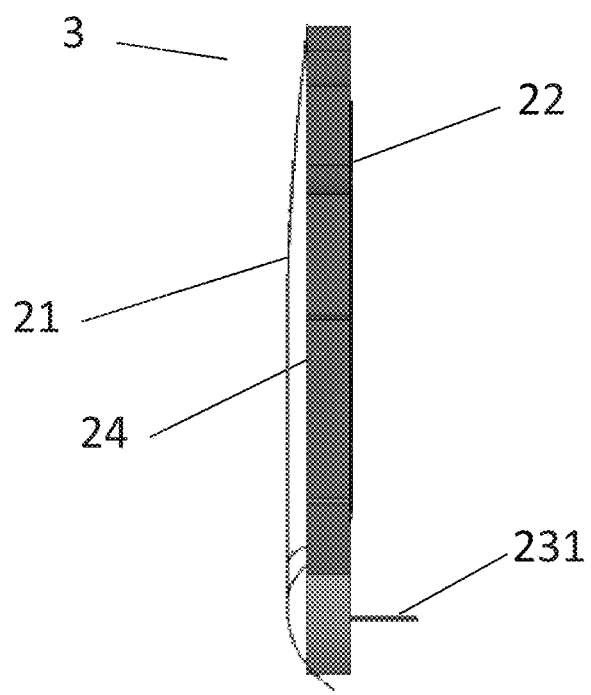
FIG. 6 is a view in section of the antenna of FIG. 5.

FIG. 5 illustrates a communications antenna 3 according to one specific embodiment of the proposed technique. FIG. 6 is a view in section of the antenna of FIG. 5 along the axis A-A'. The antenna 3 according to this embodiment comprises a first zone 21 situated in a first plane (higher-level plane), a second zone 22 situated in a second plane (lower-level plane), a third zone 23 (connection zone). In particular, this antenna 3 comprises a holding foam 24 disposed between the higher-level plane and said lower-level plane to maintain the second zone 22 in the lower-level plane. The size of the holding foam 24 is appreciably identical to that of the antenna 3. The holding foam comprises for example a portion that is of varying size constituted by polyurethane foam. The holding foam 24 comprises a first aperture 241 in a central zone that corresponds to the positions of the light-emitting diodes 110 mounted on the second zone of the antenna 3. This first aperture 241 lets through the light emitted by the light-emitting diodes 110 without necessarily requiring the use of a specific light guide. If necessary, the internal walls of the first aperture can be optionally lined with a reflective layer to guide the light.

The holding foam 24 can also include a second aperture 242 in a zone corresponding to the connection zone 23 of the antenna 3. The connector 231 of the connection zone 23 can pass through the holding foam 24 by this second aperture 242 to be inserted into a female connector disposed on an electronic board 72 behind the antenna 3. The peripheral area of the holding foam 24 comes into contact with the first zone 21 of the antenna 3, and the portions around the first aperture of the foam come into contact with the second zone 22 of the antenna in order to hold the second zone 22 in the lower-level plane. Preferably, the lower-level plane is recessed by 6 mm relative to the higher-level plane. The preferred thickness of the holding foam is thus of the order of 6 mm.

The value of using a holding foam between the first zone and the second zone is twofold: on the one hand this holding foam makes it possible to keep a constant distance between the first zone and the second zone without using any costly material and without using a frame made of plastic material; secondly, this foam has the advantage of absorbing shocks in a simple and optimal way. Indeed, when the terminal undergoes an impact or deterioration, the foam is conformed to absorb the resulting shock, thus preventing on the one hand deterioration of the electronic board and on the other hand sudden breakage of the front face. Thus, the terminal of the present technique is more flexible and more resistant than the prior-art terminals.

Figure 7:
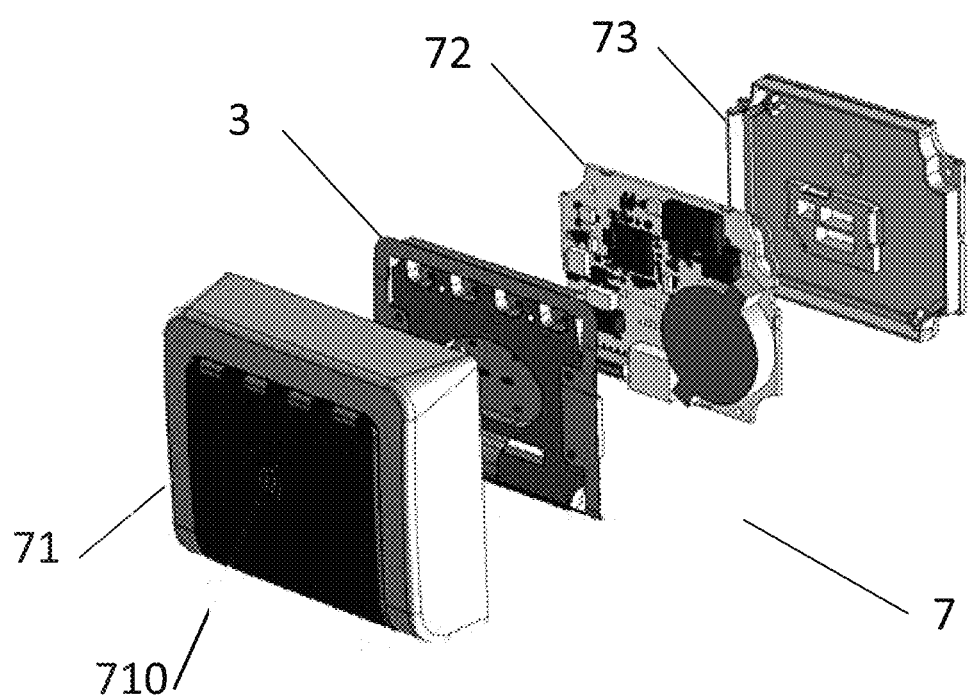
FIG. 7 is an exploded view of the contactless payment terminal according to the proposed technique.

FIG. 7 is an exploded view of a contactless payment terminal according to the proposed technique. This contactless payment terminal 7 comprises a front cover 71, a communications antenna 3 according to the proposed technique, an electronic board 22 and a rear cover 73. The front cover 71 comprises a contactless payment logo 710 at the center of an external surface. This logo fulfils the function of an indicator used to indicate the induction zone of the contactless payment terminal. A user can make his contactless payment means pass before the logo 710 of the contactless payment terminal in order to carry out a transaction. The logo 710 is at least partially transparent and capable of being illuminated by light-emitting diodes 110 mounted on the second area 22 of the antenna 3.

The first zone 21 f the antenna is mounted behind the front cover 71 of the payment terminal 7. It is kept directly against the inner surface of the front cover 71 by adhesives to obtain the best performance while at the same time ensuring reproducibility of the assembly. This assembly minimizes the space between the antenna 3 and the front cover 71. Through the holding foam 24, the second zone 22 of the antenna 3 remains in a lower-level plane that is recessed by 6 mm relative to the higher-level plane in which the first zone 21 is situated. The electronic board 72 is placed behind the antenna 3. The antenna 3 and the electronic board 72 are fixed in a case formed by the front cover 71 and the rear cover 73.

As explained here above, under human action or machine action, the contactless payment terminal 7 can undergo impacts and be damaged. The protection index 1K determines the degree of protection of the electrical equipment, through its resistance to shocks of external, mechanical origin (European standard EN 62262). The protection index IK is scaled in levels of protection ranging from 1 to 10 as a function of the weight received and the height or the location of the fall.

When the level of protection of payment terminals of the proposed technique is tested according to the IK10 index, a deformation of the front cover of the payment terminal is measured at less than 6 mm. The part between the first zone 21 and the second zone 22 of the antenna, occupied by the holding foam, will then be compressed without transmitting the energy suddenly to the electronic components behind the holding foam 24. For the light-emitting diodes mounted on the second zone of the antenna 3, no energy is transmitted thereto. Indeed, these light-emitting diodes do not come into contact with the holding foam 24 through the first aperture 241 of the holding foam 24. Nor do they come into contact with the front cover because the maximum deformation of the front cover is 6 mm which is smaller than the distance kept between the second zone 22 of the antenna and the first zone 21.

The above-described examples of embodiments are clearly given purely by way of an indication. Those skilled in the art can understand the advantages provided by the present technique and especially the advantages provided by the use of a flexible antenna disposed at two different levels themselves separated by a shock-absorbing foam. It is clear that such an antenna can be used in other arrangements and other devices without departing from the framework of the present technique.

The invention claimed is:

1. A communications antenna comprising:
a first zone for sending and receiving signals; and
a second zone for receiving electronic components, said first zone being situated in a first plane, called a higher-level plane, said second zone being situated in a second plane, called a lower-level plane, and said lower-level plane being appreciably parallel to said higher-level plane, and
wherein the first and second zones of the communications antenna are formed by a same flexible printed-circuit board.

2. The communications antenna according to claim 1, wherein the antenna is conformed to carry out near-field communications.

3. The communications antenna according to claim 1, wherein said first zone is a peripheral zone of said antenna, comprising at least one turn.

4. The communications antenna according to claim 1, wherein said second zone is a zone at the center of said antenna.

5. The communications antenna according to claim 1, wherein said lower-level plane is recessed by about 6 mm relative to said higher-level plane.

6. The communications antenna according to claim 1, wherein the electronic components that can be received on said second zone comprise at least one light-emitting diode.

7. The communications antenna according to claim 1, further comprising a holding foam, said holding foam being placed between said higher-level plane and said lower-level plane to hold said second zone in said lower-level plane.

8. The communications antenna according to claim 7, wherein said holding foam comprises a first aperture made above the electronic components on said second zone.

9. A contactless payment terminal comprising:
a front cover;
an electronic board; and
a communications antenna disposed between said front cover and said electronic board, said communications antenna being formed by a flexible printed-circuit board and comprising:
a first zone on the flexible printed circuit board for sending and receiving signals; and
a second zone on the flexible printed circuit board for receiving electronic components, said first zone being situated in a first plane, called a higher-level plane, said second zone being situated in a second plane, called a lower-level plane, and said lower-level plane being appreciably parallel to said higher-level plane.

10. The contactless payment terminal according to claim 9, wherein said first zone of said antenna is mounted on an inner surface of said front cover.

11. The contactless payment terminal according to claim 10, wherein said front cover comprises a contactless payment indicator, said second zone of said antenna being at least partially placed directly over said indicator.

12. The contactless payment terminal according to claim 11, wherein said indicator is configured to be illuminated by light-emitting diodes disposed on said second zone of said antenna.

13. The communications antenna according to claim 1, wherein the first zone and the second zone are defined by cuts in material of the flexible printed circuit board between the first and second zones.

14. The communications antenna according to claim 1, wherein the first zone and the second zone are conformed into the first and second planes from the same flexible printed circuit board.

* * * * *